Dec. 25, 1923.
O. M. MARRIOTT ET AL
1,478,482
TRACTOR ATTACHMENT HITCH
Filed March 5 1921
2 Sheets-Sheet 1
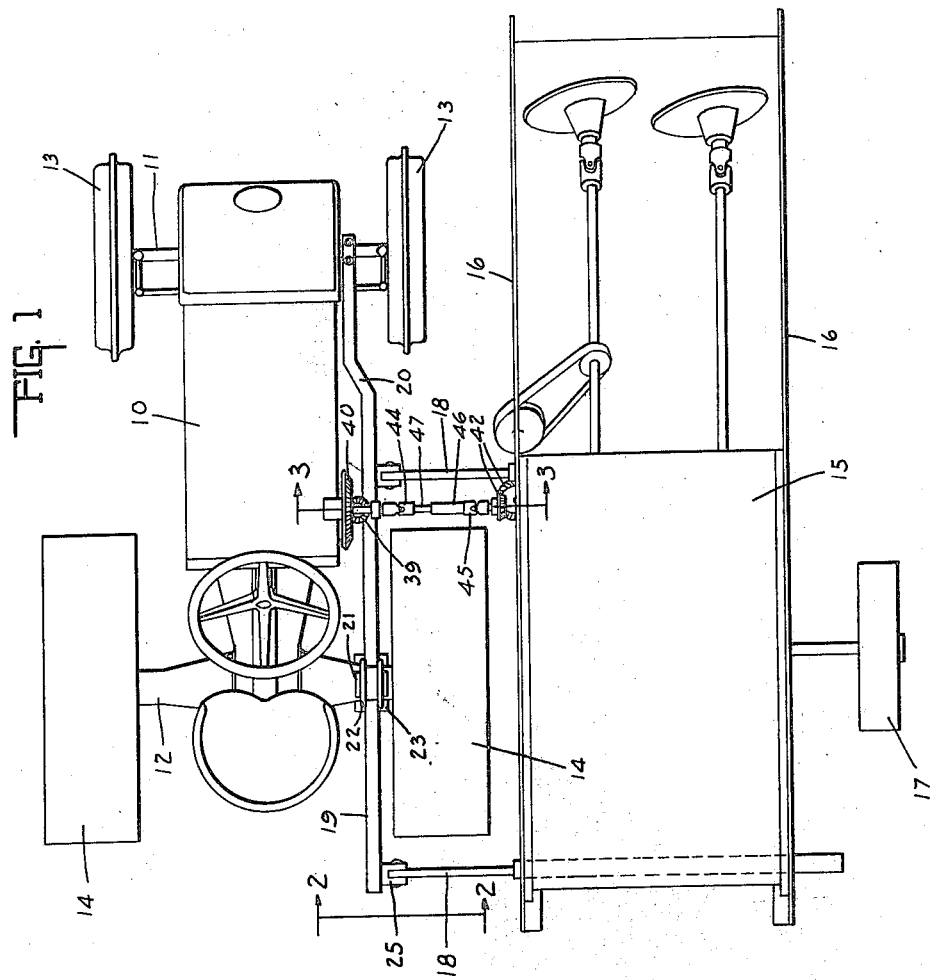
INVENTORS.
Oscar M. Marriott.
Edwin W. Hunt.
Ernest V. Kirby.
BY
ATTORNEYS.

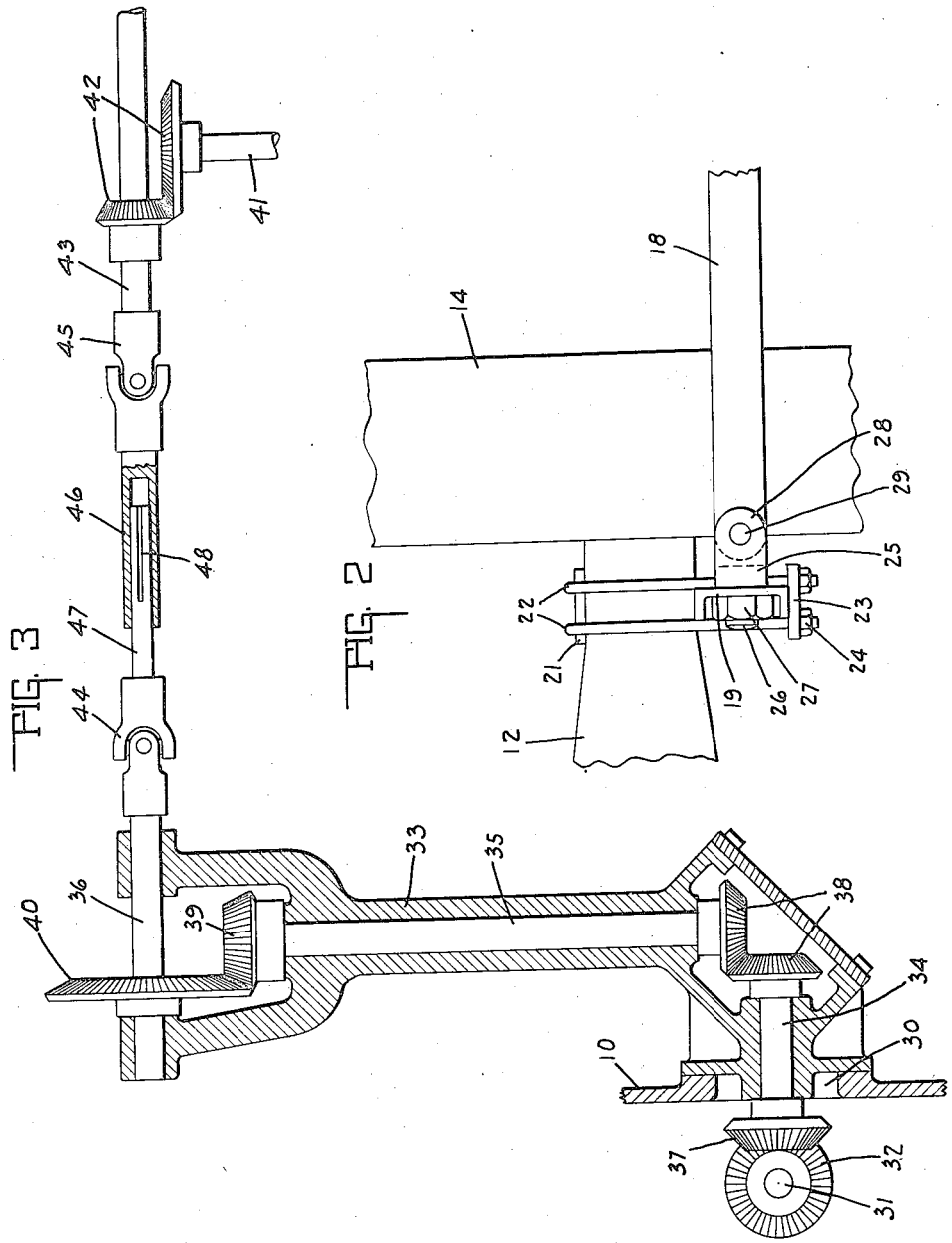

Patented Dec. 25, 1923.

1,478,482

UNITED STATES PATENT OFFICE.

OSCAR M. MARRIOTT, EDWIN W. HUNT, AND ERNEST V. KIRBY, OF URBANA, ILLINOIS.

TRACTOR ATTACHMENT HITCH.

Application filed March 5, 1921. Serial No. 449,370.

*To all whom it may concern:*

Be it known that we, OSCAR M. MARRIOTT, EDWIN W. HUNT, and ERNEST V. KIRBY, respectively, citizens of the United States, and residents of Urbana, county of Champaign, and State of Illinois, have invented a certain new and useful Tractor Attachment Hitch; and we do hereby declare that the following is a full, clear, and exact description thereof, reference being had to the accompanying drawings, in which like numerals refer to like parts.

This invention relates to a tractor attachment hitch.

The chief object of this invention is to provide a hitch for an attachment whereby the same may be associated with a tractor to be supported thereby and to be operated thereby, as well as propelled thereby.

The chief feature of the invention consists in the flexibility of the supporting hitch, whereby the attachment is flexibly supported upon the tractor, and the flexibility of the power transmitting mechanism, whereby power will be transmitted from the tractor to the attachment at all times without interference, due to the flexible mounting of the attachment of the tractor. This invention enables the attachment, such as a harvester, husker or the like, to be lightened sufficiently to enable it to be readily drawn and propelled by a tractor.

The full nature of the invention will be understood from the accompanying drawings and the following description and claims.

In the drawings, Fig. 1 is a plan view of a tractor and an attachment supported thereby and adapted to be propelled and operated thereby. Fig. 2 is an enlarged elevational view of a detail of the flexible support and is taken on line 2—2 of Fig. 1. Fig. 3 is an enlarged elevational view of the flexible driving connection and is taken on line 3—3 of Fig. 1 and in the direction of the arrows.

In the drawings 10 indicates a tractor provided with the front axle means 11, the rear axle means 12 and the usual front wheels 13 and usual rear wheels 14. 15 indicates generally an attachment which is to be operated by, propelled by and supported by the tractor 10, and in the present instance said attachment is illustrated as a corn husking machine. 16 indicates suitable frame means of the corn husking machine, and 17 indicates a supporting wheel as shown. Suitably secured to the attachment or corn husking machine is a pair of preferably transverse supporting members 18, which are adapted to support the attachment with the wheel 17. The supporting transverse members 18 protrude from the tractor and are flexibly supported thereby in the following maner. Between the wheels 13 and 14 and extending longitudinally of the tractor is suitable bar means, which in the present instance is illustrated, see Fig. 2, as a channel 19, and said channel may be suitably offset as desired or necessary. The channel 19 is suitably supported by the front and rear axles 11 and 12 respectively. In the present instance said support consists of a bearing plate 21 positioned upon the axle, a plurality of U-bolts 22 which have their head portions seatable and bearable upon said plate 21 and the prong portions of which straddle the axle and extend into position and into association with a supporting plate 23. Said bolts and plate 23 are secured together in rigid relation by the nuts 24 or other suitable means such that the channel 19 will be rigidly secured to and supported by the axles 11 and 12. The transverse member 18 is flexibly supported by being hingedly supported upon the channel 19. The hinge support in the present instance comprises a bifurcated lug 25 which has a bolt portion 26 extending through the channel 19 upon which is secured a retaining nut 27. The bifurcated lug 25 provides the ear portions 28 adapted to receive one end of the transverse member 18, and said ears and said transverse member are secured together by suitable hinge means, such as the pin 29. Thus, the transverse member 18 is hingedly supported upon the longitudinal member 19 and in protruding relation thereto.

Reference will now be had to Figs. 1 and 3 respectively. In order that power may be transmitted from the tractor to the attachment at all times without loss or variation, and in spite of the flexible connection between the attachment and the tractor, the following transmission mechanism is provided. The tractor frame 10 is provided with an opening 30 through which access is had to a power takeoff shaft 31 upon which is suitably secured a bevel gear 32. The opening 30 in the usual tractor construction is closed by a step or pulley, which in the present instance is removed, and an auxiliary power transmission supporting frame 33 is suitably secured to the tractor frame 10 by any convenient means. Said frame rotatably supports a plurality of shafts as the shafts 34, 35 and 36. The shafts 34, 35 and 36 are connected with the shaft 31 by the bevel gears 32, 37, 38, 39 and 40, the last mentioned gear being supported upon the shaft 36. The drive shaft 41 is suitably secured in the attachment, and associated therewith are a pair of mitre gears 42, one of said gears being supported upon a shaft 43. Between the shaft 36 and the shaft 43 is a pair of universal joints 44 and 45, each being secured respectively to said shafts 36 and 43. The universal joints are connected together by a splined connection which is slidable, as illustrated clearly in Fig. 3. Said splined and driving connection consists of a tubular shaft 46, an inner shaft 47 and spline means 48. Thus, power is adapted to be transmitted from the takeoff shaft 31 to the attachment shaft 41 through the yielding and flexible driving connection which will yield with the yielding movement of the attachment upon the tractor.

It will be understood that the invention above described may be applied in a variety of similar ways, to heavy duty machines for field work, such as a corn binder, husker and harvester, or like machines wherein it is desired to operate them about a field, the weight being so reduced as to render them more adaptable and flexible to use in connection with a tractor.

The invention claimed is:

A tractor attachment hitch for lateral support from a self-propelled four wheel vehicle, including a longitudinal member rigidly secured to the front and rear wheel supports and between the wheels thereof, and a plurality of protruding and outwardly extending attachment supporting members hingedly supported for vertical movement upon said longitudinal member and extending substantially transversely thereof.

In witness whereof, we have hereunto affixed our signatures.

OSCAR M. MARRIOTT.
EDWIN W. HUNT.
ERNEST V. KIRBY.